United States Patent [19]

Fuhrmann et al.

[11] Patent Number: 6,007,057
[45] Date of Patent: Dec. 28, 1999

[54] GAS SPRING WITH BRAKING MEANS

[75] Inventors: Castor Fuhrmann, Brachtendorf; Klaus Koch, Dahlheim; Horst Maury, St. Sebastian; Karl Seibert, Alken; Michael Rüdesheim, Niederburg, all of Germany

[73] Assignee: Stabilus GmbH, Koblenz, Germany

[21] Appl. No.: 08/982,902

[22] Filed: Dec. 2, 1997

[30] Foreign Application Priority Data

Dec. 2, 1996 [DE] Germany ............................ 196 49 836

[51] Int. Cl.⁶ ........................................................ F16F 9/14
[52] U.S. Cl. .................................. 267/64.15; 188/282.1; 188/317; 188/322.15
[58] Field of Search ............................ 267/64.15, 64.11, 267/64.12, 120, 124; 188/280, 281, 282.1, 322.15, 322.22, 316, 317, 318

[56] References Cited

U.S. PATENT DOCUMENTS

| | | | |
|---|---|---|---|
| 2,310,570 | 2/1943 | Briggs | 188/282.1 |
| 3,074,515 | 1/1963 | MacLellan | 188/282.1 |
| 4,307,875 | 12/1981 | Schnitzius et al. | 267/120 |
| 4,433,759 | 2/1984 | Ichinose | 188/282.1 |
| 4,595,182 | 6/1986 | Freitag et al. | 267/120 |
| 4,961,482 | 10/1990 | Pohlenz et al. | 188/280 |
| 5,042,625 | 8/1991 | Maus | 188/280 |
| 5,259,294 | 11/1993 | May | 92/181 P |
| 5,799,759 | 9/1998 | Koch | 188/300 |

FOREIGN PATENT DOCUMENTS

| | | |
|---|---|---|
| 2024749 | 12/1971 | Germany . |
| 2540648 | 3/1977 | Germany . |
| 2721933 C3 | 11/1978 | Germany . |
| 3041937 C2 | 5/1982 | Germany . |
| 3301544 | 7/1984 | Germany . |
| 3813402 A1 | 11/1989 | Germany . |
| 4107383 A1 | 9/1992 | Germany . |
| 19532996 A1 | 3/1996 | Germany . |

Primary Examiner—Mark T. Le
Assistant Examiner—Pamela J. Lipka
Attorney, Agent, or Firm—Baker & Botts, LLP

[57] ABSTRACT

A pressurized gas spring, which exerts an expulsion force on the piston rod entailing a maximum extension velocity of the piston rod, includes braking means effective at a velocity of motion due to external forces above the maximum extension velocity for limiting the velocity of motion to a desired measure.

16 Claims, 4 Drawing Sheets

GAS SPRING WITH BRAKING MEANS

BACKGROUND OF THE INVENTION

1. Field of the Invention

The present invention relates to a gas spring having braking means for controlling overfast extension of the spring in emergency conditions.

THE PRIOR ART

Gas springs are generally employed as lift aids to minimize the manual force required on the part of a user, as, for example, in connection with vehicle engine covers, trunk lids, rear doors, etc. (hereinafter "vehicle flaps"). DE3,301,544 A1 discloses a gas spring as a lift member for opening vehicle flaps that swing upward, in which a piston divides the cylinder of the gas spring into two working chambers. A "bypass" groove defines a first range for the opening angle of the vehicle flap, which range the gas spring will in principle allow. An excess pressure valve is also provided, which is openable indirectly by additional manual force so as to eliminate the blocking function of the gas spring and permit further extension of the gas spring. This gas spring recommends itself especially for vehicles having a large flap, e.g., an engine hood, where the possibility exists that the flap may strike the ceiling in a garage, or cannot be closed by persons of slight build.

In some applications of gas springs, for example, vehicle flaps, it is desired that after an irregular closing action the vehicle flap may not be reopened freely by the airstream or comparable outside forces. Similar situations arise for casement windows. Here, the external forces are counter acted by the extension force of the gas spring.

SUMMARY OF THE INVENTION

It is therefore an object of the present invention to meet the aforementioned requirements of the prior art.

According to the invention, this object is accomplished by the provision of a gas spring having braking means which is operative at a velocity of motion of the piston rod due to outside forces above the maximum extension velocity to limit the velocity of motion to a desired measure. A particular advantage of the invention is that operation of the blocking means is effective over the full stroke of the piston rod. One need not accept any minimum aperture angle. Besides, any fixed stops in the normal operation of the gas spring are avoided.

In a first embodiment, a piston attached to the piston rod divides the cylinder into two working chambers communicating by way of at least one throughflow passage in the piston, the throughflow passage(s) being at least partly closed by a cover plate from a defined velocity of motion against a force tending to keep the same open. The static gas pressure is proportional to the velocity of motion and may be employed as direct quantity for the braking means. The total blockage, or a diminished lift velocity, may be achieved according to the cross sectional throughflow area remaining.

In accordance with the invention, the braking means can be embodied with great simplicity by utilizing the static pressure in the working chamber associated with the cover plate to elastically deform the cover plates so as fully or partially to block the cross section(s) of the throughflow passage(s). The advantage consists in that no axially moveable parts need be employed. Experiments have shown that a simple cover plate made of polyurethane will perform the function called for to complete satisfaction.

Additionally or alternatively, the cover plate may be acted upon firstly from a defined velocity of motion by the static pressure in the closing direction, and secondly by a spring element acting in the opening direction. The spring element reduces the scatter in the elasticity of the cover plate, so that a completely rigid but axially moveable cover plate may alternatively be employed.

In a further embodiment, the cover plate is in communication with a safety element that holds the cover plate lifted off from the throughflow passage(s) below the defined velocity of motion, whereas the safety element detaches itself above the velocity of motion and the cover plate at least partially closes the throughflow passage(s). An oscillation of the cover plate is prevented, and with it any noises that occur. In this embodiment, the safety element preferably comprises a catch plate acted upon by the static pressure and axially moveable relative to the throughflow passage(s), the plate comprising part of a releasable catch connection along with another part arranged stationary with respect to the piston.

According to a further advantageous feature of this embodiment, a disk backs up the cover plate and is acted upon by the gas pressure. The disk preferably includes a sleeve segment, which in turn includes a catch groove in which the catch plate engages. Inside the sleeve segment, a compression spring is arranged to act in the direction of the static pressure. The compression spring makes possible the use of a comparatively small static pressure surface. In addition, the temperature sensitivity of the entire braking means is lessened, since the static pressure assumes a smaller portion of the closing force of the cover plate. In further modification, the compression spring is tensed between the backup disk acted upon by the pressure and the catch plate.

For a reliable solution of the catch connection, with a justifiable expenditure of force, the sleeve segment is made radially moveable or enlargeable at least in the region of the catch groove, as for example, by at least one axial slot in the sleeve segment.

In an alternative embodiment, the braking means is arranged between the cylinder and the piston and piston rod unit, and preferably comprising a brake body and a prestress element. The prestress element executes a setting displacement due to a reaction on the basis of the augmented velocity of motion of the piston rod, which displacement effects a change in the radial prestress of the brake body relative to the cylinder. The brake body or the prestress element may be fashioned as an inert body, so that inertia generates the reaction for the displacement inside the braking means. With these design features, the braking means is completely independent of the internal gas pressure of the gas spring, so that a temperature insensitivity of the braking means is ensured as well. The brake body or the prestress element may comprise a static pressure surface as well. In such case, the effective static pressure brings about an axial motion between the brake body and the prestress element.

In still another embodiment, the braking means is arranged between the cylinder and the piston and piston rod unit, and preferably comprising a clamp disk set oblique to the longitudinal axis of the gas spring and held by a spring in a free run position. Upon the occurrence of a defined velocity of motion of the piston rod, the static pressure inside the working chamber causes the clamp disk to tilt and establish contact between the clamp disk and the cylinder. For an especially compact spring, provision is made for the oblique segment of the clamp disk to be produced by a spring tongue engaging the clamp disk on one side.

BRIEF DESCRIPTION OF THE DRAWINGS

Preferred embodiments of the invention will be described in more detail with reference to the following drawings, in which.

DESCRIPTION OF THE PREFERRED EMBODIMENTS

Figure 1:
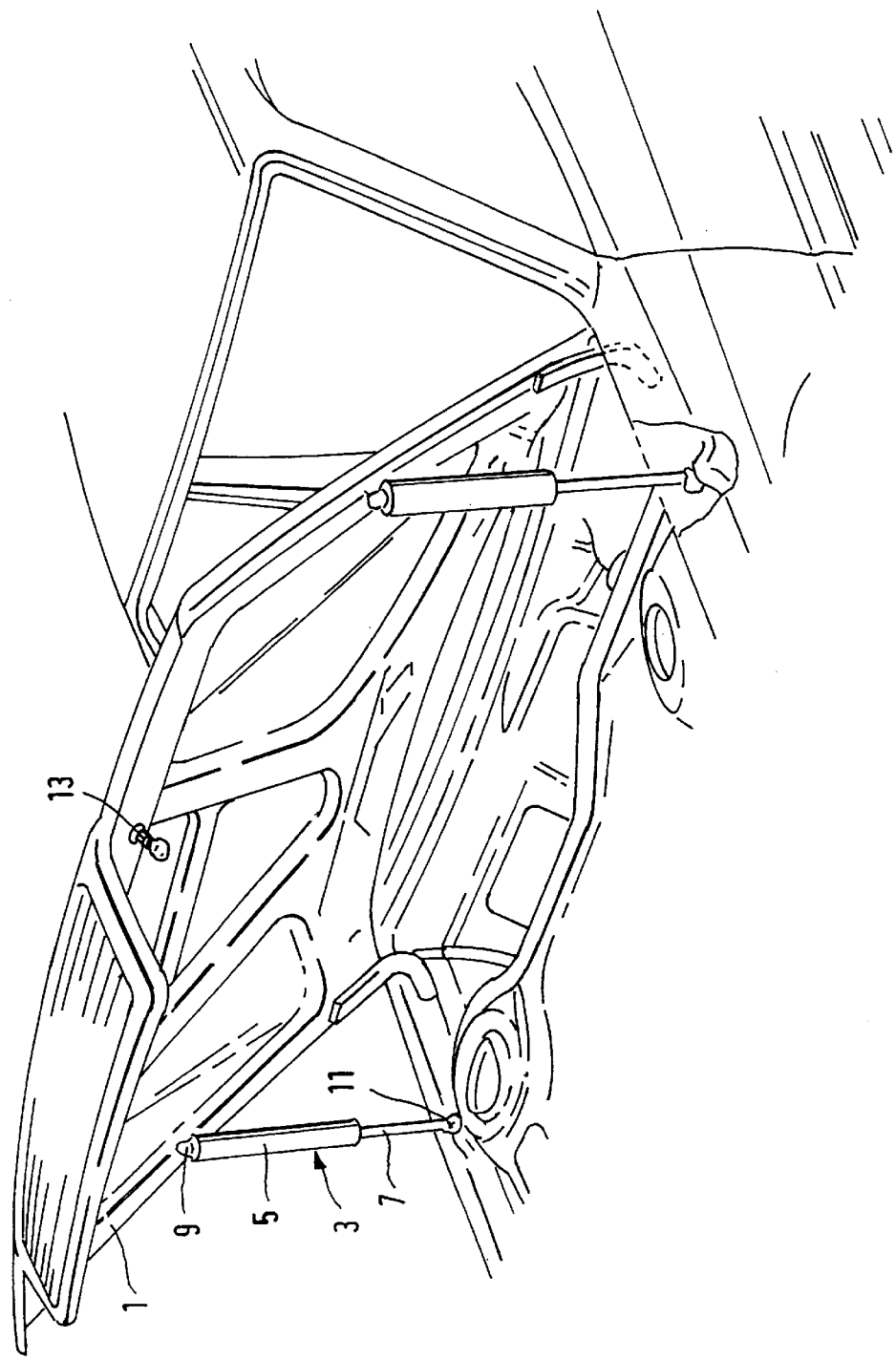
FIG. 1 shows an example of a gas spring installation with braking means in accordance with the invention.

FIG. 1 shows a portion, much simplified, of a motor vehicle, whose front hood 1 can be opened in a power-assisted manner by two gas springs 3. As is conventional, each gas spring 3 includes a pressurized cylinder 5 in which a piston rod 7 is axially moveable. Mounting members 9 and 11 connect the gas spring 3 to the hood 1 and the vehicle body, respectively.

Each vehicle has a hood lock 13, ordinarily with two stages of closure, so that an unintended opening of the hood while the vehicle is in motion is prevented. As may be seen from FIG. 1, a partly opened hood affords some considerable purchase area to the wind, so that an undesired opening motion of the hood, for example, in the case of a defective hood closure, may become very rapid.

In order to prevent such an undesired opening motion, in accordance with the invention the gas springs 3 possess braking means 15, preferred embodiments of which are described in more detail hereinbelow by reference to FIGS. 2–6, wherein like numbers denote like parts.

Figure 2:
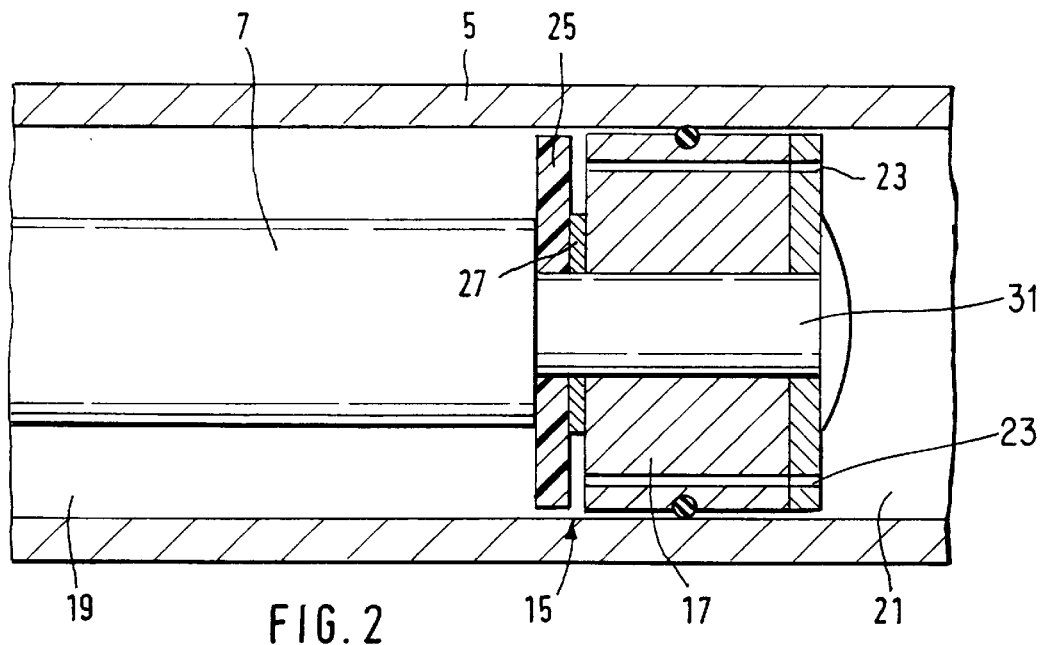
FIGS 2 to 6 show illustrative embodiments of a gas spring having braking means provided therein in accordance with the invention.

FIG. 2 shows a portion of a gas spring 3. To the piston rod 7 is attached a piston 17 dividing the cylinder 5, which is filled with a pressurized gas, into two working chambers 19 and 21. The two working chambers communicate with each other by way of at least one throughflow passage 23 in the piston 17 (two are shown in FIG. 2), so that a gas exchange can take place between the two chambers. A resultant expulsion force urges the piston rod 7 out of the cylinder 5 by virtue of the gas pressure acting on the cross section of the piston rod. This expulsion force defines a maximum extension velocity of the piston rod.

Should it occur that the front hood is not properly closed and external forces, due for example to the airstream, trigger an opening motion of the front hood, the gas pressure in the working chamber 19 will suddenly rise, causing a static pressure to act on a cover plate 25 of the brake means 15. In normal operation, the cover plate 25 is spaced from the throughflow passages 23 by a spacer disk 27.

In the embodiment of FIG. 2, the cover plate 25 is made of an elastically deformable material, such as polyurethane. Upon rapid increase of the static pressure in the chamber 19, the plate is deformed towards the piston 17, so as to reduce or even completely eliminate the spacing therebetween. The throughflow passages 23 are thereby partially or fully blocked by the cover plate 25. In this condition of the gas spring, the extension velocity is reduced, or extension of the gas spring is blocked entirely. For the vehicle driver, enough time remains to bring the vehicle to a stop before the front hood fully opens. Experiments have shown that the blocking function of the plate 25 is maintained until a thrust-in motion of the piston rod is triggered.

Figure 3:
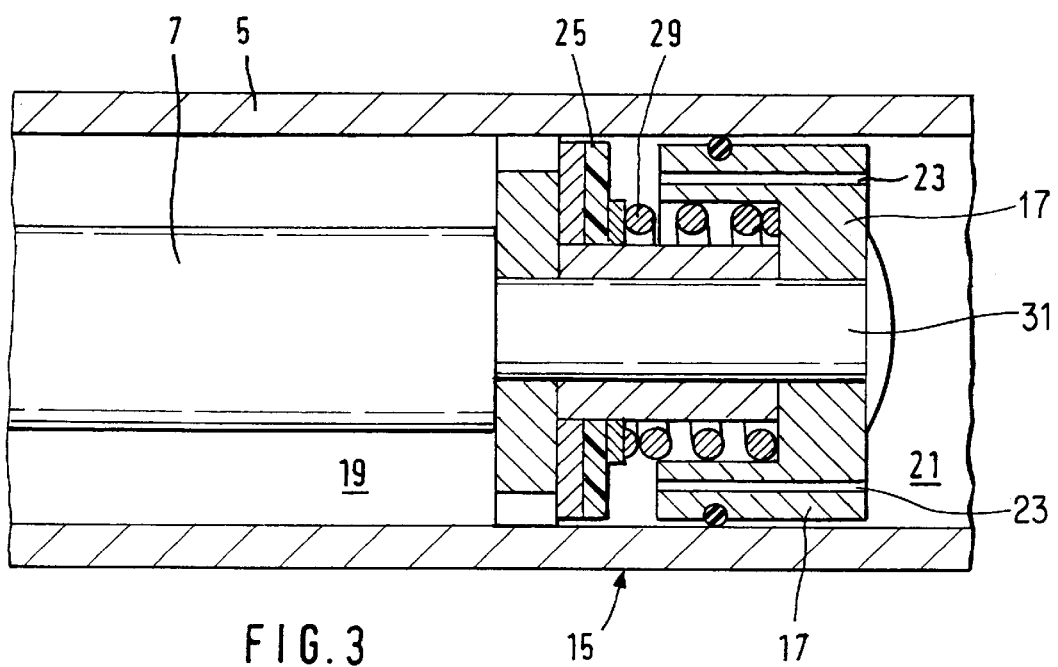

In FIG. 3, instead of an elastically deformable cover plate, an axially moveable cover plate 25 is biased to the open position by a spring element 29 mounted on the piston rod pin 31. The cover plate 25 moves to the closed position, relative to the passages 23, when the static pressure in chamber 19 is sufficiently high to overcome the force of the spring 29.

Figure 4:
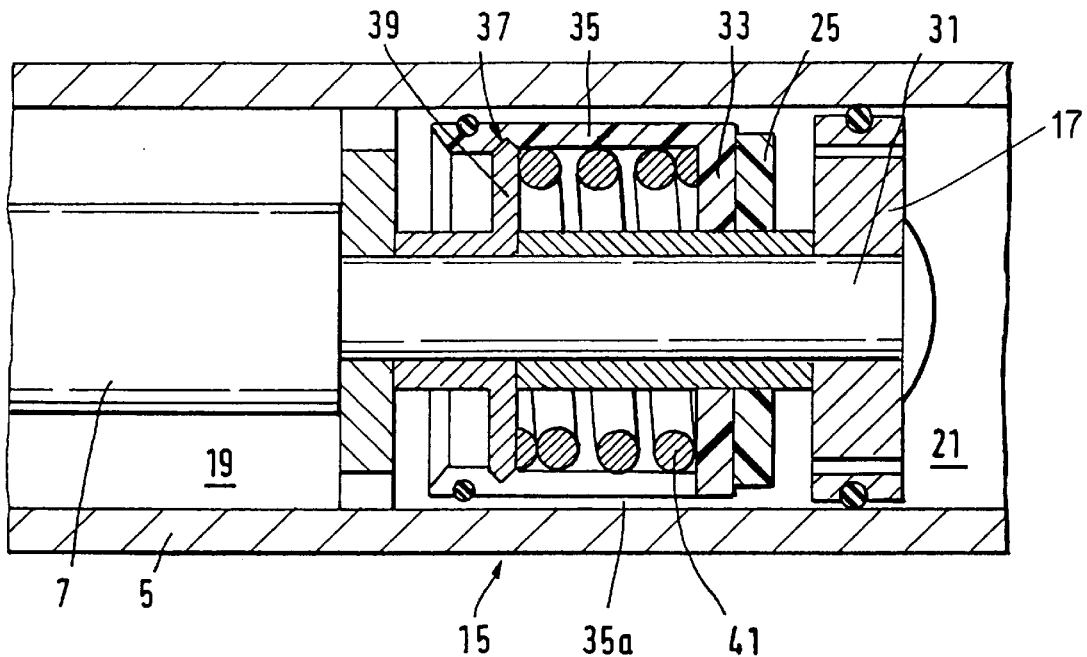

In the embodiment of FIG. 4, the braking means 15 likewise includes an axially moveable cover plate 25 mounted on the piston rod pin 31. The static pressure surface is presented by a disk 33 immediately following the cover plate 25. The disk 33 has an axial sleeve segment 35 having an internal catch groove 37 forming part of a catch connection. A stationary catch plate 39 engages the catch groove 37 so as to retain the disk 33 axially fixed in normal operation. A compression spring 41 is guided inside the sleeve segment 35 and is axially stressed between the catch plate 39 and the disk 33, and so is completely clamped.

The disk 33 is biased in the closing direction, i.e., towards the piston 17, not only by the static pressure in the chamber 19 but also by the force of the compression spring 41. This produces a resultant closing force of static pressure x area, superimposed on the force of the compression spring 41. If the resultant closing force is greater than the holding force of the catch connection between the groove 37 and the catch plate 39, the throughflow passages 23 in the piston of the gas spring will be blocked. Thus, the catch connection between the catch groove 37 and the catch plate 39 generates a holding force which results in a clear separation between normal operation of the gas spring 3 and an emergency situation. An axial slit 35a in the sleeve segment 35 allows an adequate radial movement of enlargement of the sleeve segment so that the engagement between the catch plate 39 and the catch groove 37 can be dependably released.

Figure 5:
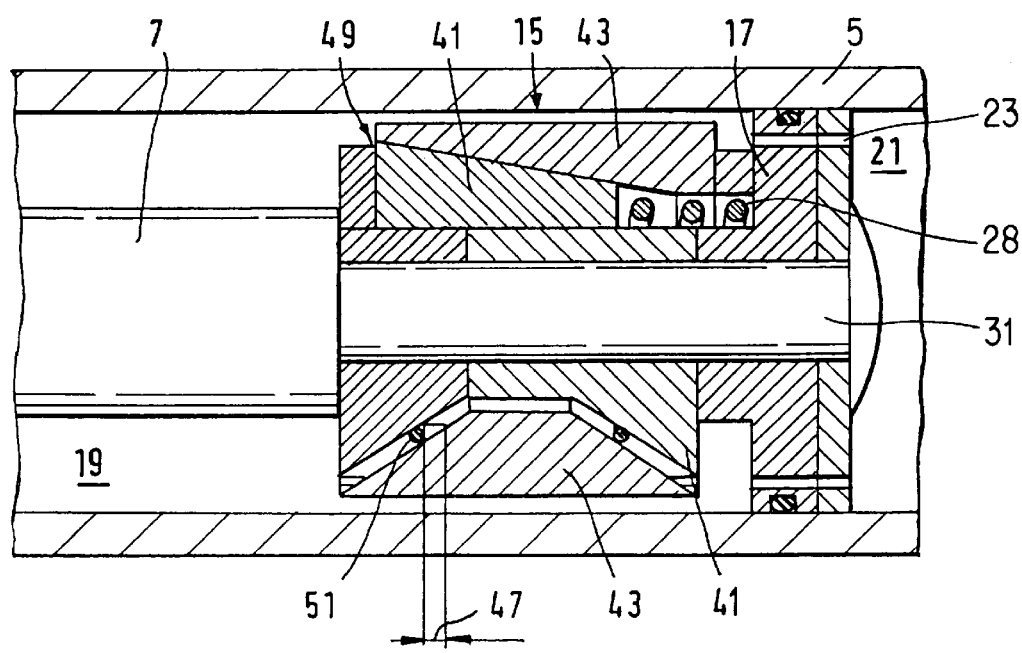

FIG. 5 shows two modifications, in each of which a brake body 43 and a prestress element 41 execute a setting displacement 47 in their relative positions that brings about a change in the radial prestress of the brake body 43 with respect to the cylinder 5.

In the upper half of the figure, the prestress element 41 is acted upon firstly by the static pressure and secondly by the spring element 28, which is compressed between the prestress element and the piston 17. If the static pressure exceeds a certain level, then the prestress element 41 executes the relative motion, a radial enlargement of the brake body 43 being achieved by way of a taper connection 49 between the body 43 and the prestress element 41. An axial slot (not shown) is formed in the brake body 43 to permit radial expansion and contraction of the body.

In the bottom half of FIG. 5, instead of the static pressure, the inertia of the brake body 43 is utilized in the working chamber 19. The sudden acceleration in the unwanted hood motion in combination with the mass of the brake body 43 imparts an inertial force directed towards the working chamber 21, moving the brake body 43 relative to the prestress element 41. A taper connection is likewise used between the brake body 43 and the prestress element 41 to modify the radial prestress of the brake body. This principle, unlike the earlier embodiments, requires no gas charge and, hence, no static pressure, so that the braking means of FIG. 5 can be extended to any desired piston-cylinder combination.

To prevent rattling noise in normal operation, the brake body 43 is elastically mounted on two annular bumpers 51. As may be seen in FIG. 5, depending on configuration, the brake body 43 or the prestress element 41 may execute the displacement 47.

Figure 6:
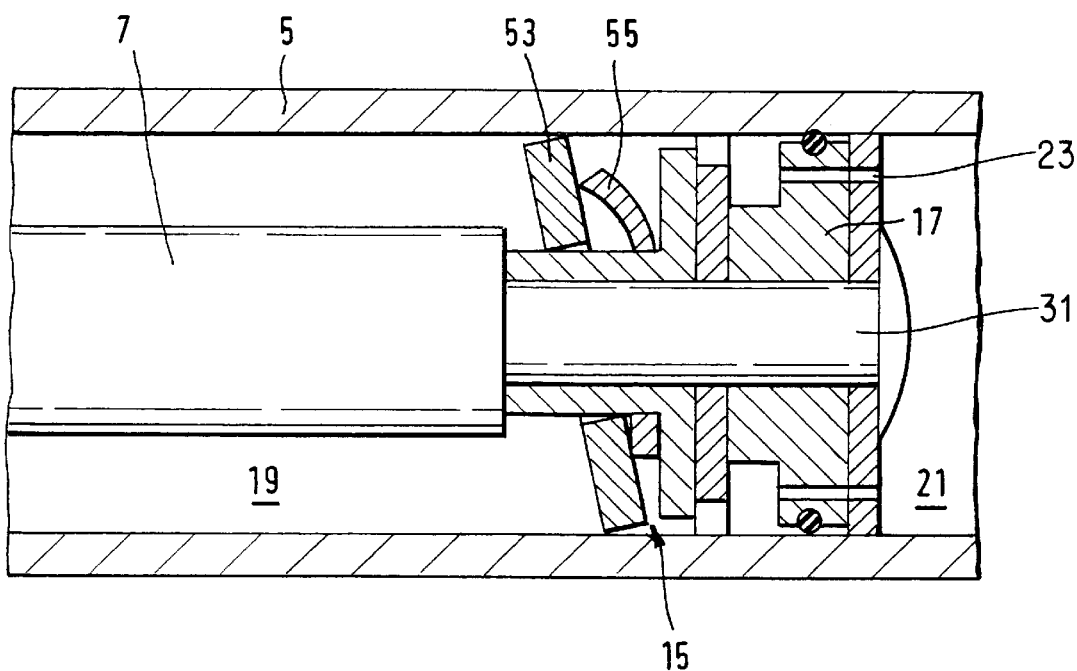

FIG. 6 shows a braking means 15 between the piston rod 7 and the cylinder 5 in which a clamp disk 53 is arranged oblique to the longitudinal axis of the gas spring. The clamp disk 53 is held by a spring, in the form of a tongue 55, in a free run position so long as the pressure in chamber 19 is in the normal range. In the emergency situation previously described, the static pressure in chamber 19 forces the clamp disk 53 against the spring tongue 55 and into a position where the clamp disk 53 is in frictional contact with the inside wall of the cylinder 5. Depending on the exit angle, a complete blockage of the piston rod motion can be achieved.

We claim:

1. A gas spring comprising:

a cylinder having a closed end and an open end;

a piston rod extending into said cylinder through said open end in sealing relationship thereto for axial movement relative to said cylinder;

a piston carried by said piston rod having at least one throughflow passage therein, said piston being sealingly guided in said cylinder for axial movement relative thereto and dividing said cylinder into first and second working chambers communicating by way of said at least one throughflow passage, said first working chamber containing said closed end of said cylinder and said second working chamber containing said open end of said cylinder;

a gas under pressure in said cylinder, said gas pressure in said first working chamber exerting an expulsion force on said piston rod; and means for braking the velocity of said piston in a direction toward said open end, effective at a defined velocity of motion of said piston, by restricting the rate of gas flow between said first and second working chambers through said at least one throughflow passage.

2. The gas spring of claim 1, wherein the braking means includes a cover plate which is responsive to the static pressure in the second working chamber resulting form said defined velocity of motion of the piston to at least partially close said at least one throughflow passage.

3. The gas spring of claim 2, wherein:

said cover plate is elastically deformable; and the static pressure in the second working chamber brings about an elastic deformation of the covered plate, said deformation representing a closure displacement with respect to said at least one throughflow passage.

4. The gas spring of claim 2, wherein:

the braking means further comprises a spring element; and the cover plate is acted upon firstly by the static pressure in said second chamber in a direction toward said closed end and secondly by said spring element in a direction toward said open end.

5. The gas spring of claim 2, wherein:

the braking means further comprises a safety element, which holds the covered plate lifted off from the throughflow passages below the defined velocity of motion, said safety element being releasable above the defined velocity of motion to permit the cover plate to at least partially close said at least one throughflow passage under the action of the static pressure.

6. The gas spring of claim 5, wherein the safety element comprises a disk acted upon by the static pressure and axially moveable relative to said cylinder, said gas spring further comprising a releasable catch connection comprising said disk as a first part and a second part arranged stationary with respect to the piston.

7. The gas spring of claim 6, wherein:

said disk comprises a sleeve segment comprising a catch groove; and said stationary second part comprises a stationary catch plate.

8. The gas spring of claim 7, wherein said braking means further comprises a compression spring located within said sleeve segment and acting in the direction of the static pressure.

9. The gas spring of claim 8, wherein the compression spring is axially tensed between said disk and the catch plate.

10. The gas spring of claim 8, wherein the sleeve segment is radially moveable or enlargeable at least in the region of the catch groove.

11. The gas spring of claim 10, wherein the radial enlargement of the sleeve segment is achieved by at least one axial slit in the sleeve segment.

12. The gas spring of claim 1, wherein the braking means comprises a brake body and a prestress element for the brake body arranged radially between the piston rod and the cylinder, said prestress element being responsive to said defined velocity of motion of the piston for executing a setting displacement effecting a change in the radial prestress of the brake body relative to the cylinder.

13. The gas spring of claim 12, wherein the brake body or the prestress element comprises an inert body, so that inertia generates the reaction for said setting displacement within the braking means.

14. The gas spring of claim 12, wherein the brake body or the prestress element comprises a static pressure surface, the effective static pressure bringing about an axial motion between the brake body and the prestress element.

15. The gas spring of claim 1, wherein the braking means comprises a clamp disk set oblique to the longitudinal axis of the gas spring and a spring for holding said clamp disk in a free run position, the static pressure inside the second working chamber resulting forms aid defined velocity of motion and causing the clamp disk to execute a tilting motion to establish contact between the clamp disk and the cylinder.

16. The gas spring of claim 15, wherein the spring for holding said clamp disk in a free run position comprises a spring tongue engaging the clamp disk on one side.

* * * * *

UNITED STATES PATENT AND TRADEMARK OFFICE
CERTIFICATE OF CORRECTION

PATENT NO. : 6,007,057

DATED : December 28, 1999

INVENTOR(S) : Castor Fuhrmann et al.

It is certified that error appears in the above-identified patent and that said Letters Patent is hereby corrected as shown below:

Column 5, line 43, "covered" should read -- cover --;
Column 5, line 56, "covered" should read -- cover --;
Column 6, line 49, "forms aid" should read -- from said --.
Column 1, line 32, "counter acted" should read -- counteracted --.

Signed and Sealed this

Tenth Day of April, 2001

*Attest:*

NICHOLAS P. GODICI

*Attesting Officer*   Acting Director of the United States Patent and Trademark Office